(12) United States Patent
Im

(10) Patent No.: US 7,556,686 B2
(45) Date of Patent: Jul. 7, 2009

(54) MATERIAL COMPOSITION USING MAINLY YELLOW SOIL FOR CIVIL ENGINEERING AND CONSTRUCTION

(76) Inventor: Se-Kyu Im, No. 132-9, Macheon-dong, Songpa-gu, Seoul 138-120 (KR)

( * ) Notice: Subject to any disclaimer, the term of this patent is extended or adjusted under 35 U.S.C. 154(b) by 0 days.

(21) Appl. No.: 12/144,833

(22) Filed: Jun. 24, 2008

(65) Prior Publication Data
US 2009/0003939 A1    Jan. 1, 2009

(30) Foreign Application Priority Data
Jun. 28, 2007   (KR) ...................... 10-2007-0064018

(51) Int. Cl.
C09K 17/00 (2006.01)
C09K 17/40 (2006.01)
C04B 14/00 (2006.01)

(52) U.S. Cl. .................. 106/811; 106/719; 106/803; 405/263; 405/266

(58) Field of Classification Search ............... 106/719, 106/803, 811; 405/263, 266
See application file for complete search history.

(56) References Cited

FOREIGN PATENT DOCUMENTS

| KR | 10-2006-0119851 | | 11/2006 |
|---|---|---|---|
| KR | 10-2007-0007754 | | 1/2007 |
| KR | 10-2007-0013346 | | 1/2007 |
| KR | 10-0686944 | * | 2/2007 |
| KR | 10-0703054 | | 3/2007 |

OTHER PUBLICATIONS

Derwent-Acc-No. 2006-704467, abstract of KR2006007718A (Jan. 2006).*
Derwent-Acc-No. 2008-H882134, abstract of KR686944B1 (Feb. 2007).*
Derwent-Acc-No. 2008-M27432, abstract of KR823222B1 (Apr. 2008).*
Derwent-Acc-No. 2009-A41268, abstract of KR2008058747A (Jun. 2008).*
Derwent-Acc-No. 2009-B30920, abstract of KR2008006741A (Jan. 2008).*
Derwent-Acc-No. 2009-A65086, abstract of KR836704B1 (Jun. 2008).*

* cited by examiner

Primary Examiner—Anthony J Green
(74) Attorney, Agent, or Firm—Egbert Law Offices PLLC

(57) ABSTRACT

The present invention relates to a material composition using mainly yellow soil for molding structures for construction, such as a brick for construction, a heated floor plate, a block for construction, and the like. More particularly, the material composition for construction using mainly yellow soil, includes yellow soil, decomposed granite soil, a small amount of cement serving as a water-curing material, a solidifying agent serving as a material for solidification, acrylic monomers for improving the compactness of tissue to impart waterproofness and strength, and functional powder.

3 Claims, No Drawings

MATERIAL COMPOSITION USING MAINLY YELLOW SOIL FOR CIVIL ENGINEERING AND CONSTRUCTION

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a material composition using mainly yellow soil for molding structures for construction, such as a brick for construction, a heated floor plate, a block for construction, and the like. More particularly, the material composition for construction uses primarily yellow soil, the material composition comprising yellow soil, decomposed granite soil, a small amount of cement serving as a water-curing material, a solidifying agent serving as a material for solidification, acrylic monomers for improving the compactness of tissue to impart waterproofness and strength, and functional powder.

2. Description of Related Art Including Information Disclosed Under 37 CFR 1.97 and 37 CFR 1.98

Recently, cement has been widely used in the field of civil engineering and construction and has contributed largely to the development of civil engineering and construction. However, cement is known to be harmful to the human body, emits unpleasant smells in the early stages of construction and causes various kinds of cancer and various skin diseases, such as atopic dermatitis, etc. Further, when waste cement is buried in the ground, leachate oozes from the ground, and ground water and drinking water is contaminated. In particular, a serious whitening phenomenon occurs in the bottom of the East Sea, along which many cement factories are established, and thus the cultivation of seaweed and marine products becomes difficult.

As part of the plan to decrease the damage caused by cement structures, such as houses, apartments, offices, etc., and overcome sick house syndrome symptoms attributable to cement, methods and means for decreasing the amount of cement used in construction structures or building structures using mainly yellow soil are proposed. Moreover, means for providing spaces where people can live healthy and pleasant lives are also being proposed.

As conventional technologies, among construction structures using mainly yellow soil, calcined yellow soil brick is high in quality, the yellow soil brick being manufactured by drying yellow soil in several stages to increase quality, mechanically vibrating the dried yellow soil, compression-molding the vibrated yellow soil, and then calcining the molded yellow soil at high temperature. It is problematic in that enormous thermal energy is required in order to produce the yellow soil brick, and facilities for producing the yellow soil brick occupy large sites, so that the production cost increases, thereby decreasing economic efficiency. Other construction structures, made of construction materials obtained by adding white cement, lime, bituminous substances, pulp, etc. to yellow soil, are problematic in that it is difficult to secure strength and durability, and their functions are damaged from the aspect of the quality of the construction structures, in particular, exterior products and the environment.

Further, as a conventional technology for a construction structure using mainly yellow soil, Korean Patent Registration No. 10-0686944 discloses a high thermal conductive Korean floor heater using yellow soil.

The high thermal conductive Korean floor heater using yellow soil sequentially includes, from top to bottom, a finishing layer, a honeycomb plate made of a thin metal plate or a yellow soil holding layer provided therein with a lattice structure, an electromagnetic wave blocking material, made of aluminum, for covering an exothermic layer, a second heat insulating material, a filler formed therein with an air layer, and a first heat insulating material.

This Korean floor heater using yellow soil is problematic. Since an electrical heating wire is used, it is influenced by harmful electromagnetic waves, and thus it is not environment-friendly. Since its lower layer includes a first heat insulating layer made of non-woven fabric, a filler formed therein with an air layer and a second heat insulating material, its upper layer includes a finishing layer, a honeycomb plate made of a metal thin plate or a yellow soil-holding layer provided therein with a lattice structure, the thickness of a metallic material forming the honeycomb or lattice structure is at most 50~100 µm. The metallic material is filled with yellow soil powder, so that the strength due to the curing or solidification of yellow soil itself cannot be expected at all. In addition, a support cannot withstand internal pressure (load) transferred from the top.

Further, as another conventional technology for a construction structure using mainly yellow soil, Korean Unexamined Patent Publication No. 10-2007-0007754 discloses a Korean heated floor sheet using volcanic stone and yellow soil and a method of manufacturing the same. The heated floor sheet is manufactured by applying a predetermined amount of an aqueous binder solution on yellow soil and volcanic stone or yellow soil and shell fragments, having a predetermined thickness between jute cloths, pressing the resultant to cure it, and then applying an adhesive on one side of the jute cloth, and then adhering and layering a natural heated floor sheet thereon. Since this heated floor sheet is cured by the water-soluble binder, the strength thereof is very low. Further, since the binder is water-soluble, the floor sheet absorbs moisture and thus expands when humidity is high, and it greatly contracts when humidity is low. Thus, the adhesion between particles is decreased, and the particles may be smashed if serious. Further, since a thermosetting resin is used as an adhesive layer, a solvent must be necessarily used, so that volatile organic compounds (VOCs), such as formaldehyde, and the like, are generated, with the result that the heated floor sheet is harmful to the human body and is not environment-friendly.

Besides, conventional technologies for construction materials are disclosed. For example, Korean Unexamined Patent Publication No. 10-2007-0013346 discloses a heat insulating material using yellow soil mortar and a method of manufacturing the same. Korean Patent Registration No. 10-0703054 discloses a yellow soil block and a method of manufacturing the same. Korean Unexamined Patent Publication No. 10-2006-0119851 discloses a method of manufacturing a panel using yellow soil. These conventional technologies are conducted for the main purpose of producing environment-friendly construction materials, but are problematic in that a large amount of cement must be used in order to exhibit the strength of the construction materials through water-curing, and measures for removing strong alkaline materials and other harmful materials generated due to the use of this cement are insufficient.

BRIEF SUMMARY OF THE INVENTION

Accordingly, the present invention has been made keeping in mind the above problems occurring in the prior art, and an object of the present invention is to provide a composition for a construction material using mainly yellow soil, by which the amount of harmful materials generated from cement can be decreased because yellow soil has specific advantageous characteristics and a small amount of cement is used. The deterioration of physical properties due to insufficient hydration can be reinforced through solidification because a small amount of cement is used. The waterproofness, flexural strength, tensile strength and shear strength of buildings can be improved because tissue becomes compact due to the addition of acrylic monomers. Strong anions and far-infrared rays, which are helpful for the human body, can be generated and radiated because functional materials, such as monazite powder, illite powder, etc., are added together, and concomitant functions, such as antibiosis, thermal insulation, vibration-proofness, sound-proofness, deodorization, etc., can be realized due to the specific characteristics of yellow soil and illite.

DETAILED DESCRIPTION OF THE INVENTION

Hereinafter, a preferred embodiment of the present invention will be described in detail.

In order to accomplish the above object, the present invention provides a material composition for civil engineering and construction, using yellow soil as a main component, the material composition comprising: 50 wt % of yellow soil; 30 wt % of decomposed granite soil; 10 wt % of white cement; 3.5 wt % of liquid acrylic monomer containing a cross-linking agent; 2.5 wt % of a solidifying agent; 1.5 wt % of illite; 1.5 wt % of monazite powder; and 1.0 wt % of an admixing agent. Here, construction structures fabricated using the material composition may be manufactured using the combination of a water-curing method through the hydration of cement, a solidification method using a solidifying agent, and a curing method through a cross-linking process using acrylic monomer containing a cross-linking agent.

In the material composition, since the active membrane of organic matter (R.COOH, R.OH), such as humic acid, included in the yellow soil adsorbs glass-state calcium ions ($Ca^{2+}$) at the time of collecting raw materials, the hydration reaction of cement is inhibited, so that the condensation effect between soil particles is prevented or hindered, with the result that the yellow soil is improved or stabilized. Further, since the decomposed granite soil also includes yellow soil (reddish yellow soil) in an amount of 40~60 wt %, it must be heat-treated to a temperature of 250° C. to remove organic matter and moisture (up to 10%) therefrom.

Since dried yellow soil includes particles having a particle size of less than 300 mesh due to its nature, only lumps including particles thereof must be pulverized, and then the yellow soil may be used. However, since decomposed granite soil includes 40~60 wt % of coarse sand (silica sand), it is uniformly pulverized into fine particles, and is then used.

The white cement has the same composition as Portland cement. Examples of coloring components in general cement include iron oxide, titanium oxide and chromium oxide. Among the coloring components, since iron oxide has the greatest influence on yellow soil, the white cement must be suitably selected and must pass through a process for removing iron from the white cement. Therefore, the white cement, the amount of which is decreased through the process for removing iron from the white cement, does not prevent yellow soil from exhibiting original colors.

The acrylic monomer, which is methylmethacrylic monomer, is added in a liquid state.

The solidifying agent that is used in the present invention is one or more selected from among calcium chloride ($CaCl_2$), magnesium chloride ($MgCl_2$), potassium chloride, sodium chloride, ferric chloride ($FeCl_2$), magnesium sulfate ($MgSO_4$), gypsum (calcium sulfate($CaSO_4$)), and aluminum sulfate [$Al(SO_4)_3$], and is used in an aqueous solution state.

The illite, which is used as a functional material, is a kind of micaceous clay, and is represented by $K_X$ (Al, Fe'', Fe''', Mg)y(Si, Al)$_4$O10(OH)$_2$.nH$_2$O, in which x≈1~0.5 and y≈2. Illite exhibits good far-infrared ray radiation, antibiosis, deodorization and adsorptivity, and is white. Monazite is present in granite, pegmatite and a placer, is represented by (Ce, La, Di)PO$_4$, has a hardness of 5, and is a high wear-resistant material. Monazite, which is the material generating the most anions among anion-generating materials, has an anion generation rate of 5000~6500 ions/cc, and may be a material first attempted in the art.

In addition, as the admixing agent, liquid orotan 819 (sodium salt condensed naphthalenesulfonic acid 95~97%, water 3~5%), which is a material exhibiting a dehydrating function, dispersity, high fluidity and ultra-plasticity, may be a liquid admixing agent which has composite functions for decreasing the amount of water at the time of manufacturing mortar, easily conducting kneading work, and improving strength by compacting the tissue of structure. In particular, when the admixing agent of the present invention is used, the homogeneity of the structure can be secured, and the fabric of the structure can be more compact.

Observing the function and action of the composition including the components, since the yellow soil, having high plasticity and fine particles, prevents the hydration reaction of cement, the strength of cement concrete, manufactured using a soil cement method through water curing, is lower than that of general cement concrete. Moreover, in the present invention, since a small amount of cement is used in order to decrease damage caused by cement concrete, the physical properties of the cement concrete, manufactured using the composition of the present invention, are far inferior to those of general cement concrete, and thus the physical properties, including strength, of the composition of the present invention are reinforced using a solidifying agent and acrylic monomer.

Yellow soil includes fine particles having high plasticity. The organic matter included in the yellow soil prevents the hydration reaction of cement. Among the organic matter, humic acid and fulvic acid mix with calcium hydroxide, formed through the hydration reaction of cement, to form calcium humate, and the formed calcium humate destroys cement particles, thereby inhibiting the hydration reaction of cement.

Besides, yellow soil includes organic matters having large particles, which are included in animal and plant corpses and are not decomposed, and materials, which are formed upon the decomposition of animal and plant corpses by microbes. Since the organic matter and materials also prevent the hydration reaction of cement, as described above, the organic matter is removed and dried through heat treatment to some degree.

When gypsum ($CaSO_4$), serving as a solidifying agent, is added, physical properties, including strength, can be improved. For example, gypsum and active alumina in soil form ettringite ($3CaO$, $3Al_2O_3$, $CaSO_4$, $32H_2O$) and absorb a large amount of crystal water in the soil, thus decreasing water content. The gap between soil particles is filled with ettringite crystals, and thus a curing body is compacted. The strength exhibition phenomenon due to the formation of ettringite is not greatly influenced by humic acid. In addition to gypsum, another solidifying agent, such as magnesium sulfate, aluminum sulfate, or the like, also improves physical properties, including strength, through the same function and action as gypsum. Further, solidifying agents bonded with chlorine form complexes through a solidification reaction, thus improving physical properties including strength.

As an additive, the liquid acrylic monomer containing a cross-linking agent is mixed in water and then used at the time of molding a structure. The liquid acrylic monomer infiltrates into the tissue of structure through the gap between particles, thus compacting the tissue of structure and forming a reticular cross-linked structure through hydration heat of cement, additional heat treatment and polymerization in a process of curing cement. That is, the liquid acrylic monomer serves as a strength acceleration agent of structure. The liquid acrylic monomer improves tensile strength, flexural strength, adhesion, water-tightness, chemical resistance and impact resistance, but decreases surface hardness, wear resistance, and pressure resistance.

As an additive, the illite exhibits far-infrared ray radiation, antibiosis, adsorptivity, sound-proofness, thermal insulation, and deodorization, and has a function of controlling humidity in the room. As an additive, among anion generation materials (tourmaline, volcanic stone, etc.), since monazite generates the most amount of anions and has high hardness, it imparts pressure resistance, hardness and wear resistance, which are disadvantages of Korean yellow soil heated floor sheets, together with fine sand included in decomposed granite soil. In the material composition of the present invention, when the amount of yellow soil or decomposed granite soil is increased in order to decrease the amount of cement, which is harmful to the human body, the pressure resistance, hardness, wear resistance, and the like of the structure manufactured using the material composition of the present invention are remarkably deteriorated compared to the physical properties of general cement concrete. When the amount of cement is increased, the physical properties, including strength, of the structure manufactured using the material composition of the present invention can be improved through condensation due to hydration, but this is contradictory to the object of the present invention. Therefore, when the solidifying agent and liquid acrylic monomer are used, the physical properties, including strength, thereof, attributable to the small amount of cement, can be compensated for.

When too much of the solidifying agent is used, impact strength is decreased, and economic efficiency is decreased. Further, the liquid acrylic monomer is expensive and thus not economical, and when too much is used, pressure resistance, hardness and wear resistance are decreased.

Yellow soil brick was manufactured as in Example 1 in order to evaluate the function and effect of the material composition of the present invention.

EXAMPLE 1

30 kg of yellow soil, which was heat-treated at a temperature of 200~300° C., and then a lump of which was pulverized; 50 kg of decomposed granite soil, which was heat-treated at a temperature of 200~300° C., the coarse sand of which was pulverized into fine sand; and 10 kg of white cement, were uniformly mixed with 1.5 kg of illite powder and 1.5 kg of monazite powder to form a solid mixture. Subsequently, the solid mixture was added to 42 kg of a mixed solution, which was prepared by dissolving 2.5 kg of a solidifying agent, 3.5 kg of liquid acrylic monomer containing a cross-linking agent and 1 kg of a liquid admixing agent in 35 kg of water and then homogenizing them. Then, the resulting mixture was formed into mortar, and then the mortar was molded to manufacture yellow soil brick.

Subsequently, the physical properties and functions of the manufactured yellow soil brick were tested, and the test results thereof are shown in Tables 1 and 2 (see reference 1 and reference 2).

TABLE 1

Test result of physical properties of yellow soil brick

| Test items | unit | samples | results | Test method |
|---|---|---|---|---|
| Compressive strength | n/mm$^2$ | — | 24.3 | KIL4201:2003 |
| Absorptivity | % | — | 12.0 | |

TABLE 2

Test result of function of yellow soil brick

| Test items | | results | Test method |
|---|---|---|---|
| Far-infrared ray radiation (40° C.) | Radiation rate | 0.925 | KICM-FIR-1005 |
| | Radiation energy (w/m$^2$) | 3.73 × 10$^2$ | |

In addition, the amount of anions that were generated was measured using an anion measuring instrument, and, as a result, it was found that the amount thereof was 1300~1500 ions/cc, which is a large amount of anions.

As described above, the composition for the civil engineering and construction material according to the present invention is advantageous in that the amount of harmful materials generated by cement can be decreased by increasing the amount of cement that is used. The deterioration of strength and physical properties due to the insufficiency of cement can be compensated for by adding a solidifying agent and acrylic monomers and thus physical properties equal to those of general concrete structures can be obtained. Far-infrared rays, which are helpful for the human body, can be radiated and concomitant functions, such as antibiosis, thermal insulation, vibration-proofness, sound-proofness, deodorization, etc., can be realized due to the specific characteristics of yellow soil and the addition of illite as a functional material. Strong anions can be generated by adding a new material, for example, monazite, thereby providing healthy and pleasant living spaces.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A material composition for civil engineering and construction, using yellow soil as a main component, said material composition comprising:
   50 wt % of yellow soil;
   30 wt % of decomposed granite soil;
   10 wt % of white cement;
   3.5 wt % of liquid acrylic monomer containing a cross-linking agent;
   2.5 wt % of a solidifying agent;
   1.5 wt % of illite;
   1.5 wt % of monazite powder; and
   1.0 wt % of an admixing agent.

2. The material composition for civil engineering and construction according to claim 1, wherein said solidifying agent is comprised of one or more selected from a group consisting of calcium chloride, magnesium chloride, potassium chloride, sodium chloride, ferric chloride, magnesium sulfate, gypsum (calcium sulfate), and aluminum sulfate.

3. The material composition for civil engineering and construction according to claim 1, wherein said admixing agent comprises sodium salt condensed naphthalenesulfonic acid 95~97%, water 3~5%.

* * * * *